No. 891,709. PATENTED JUNE 23, 1908.
E. B. LAMME & E. KETTERER.
STONE GATHERING MACHINE.
APPLICATION FILED OCT. 1, 1907.

4 SHEETS—SHEET 2.

WITNESSES
G.R. Thomas
J.L. McAuliffe

INVENTORS
Edwin B. Lamme
Emil Ketterer
BY
ATTORNEYS

No. 891,709.
PATENTED JUNE 23, 1908.
E. B. LAMME & E. KETTERER.
STONE GATHERING MACHINE.
APPLICATION FILED OCT. 1, 1907.
4 SHEETS—SHEET 3.
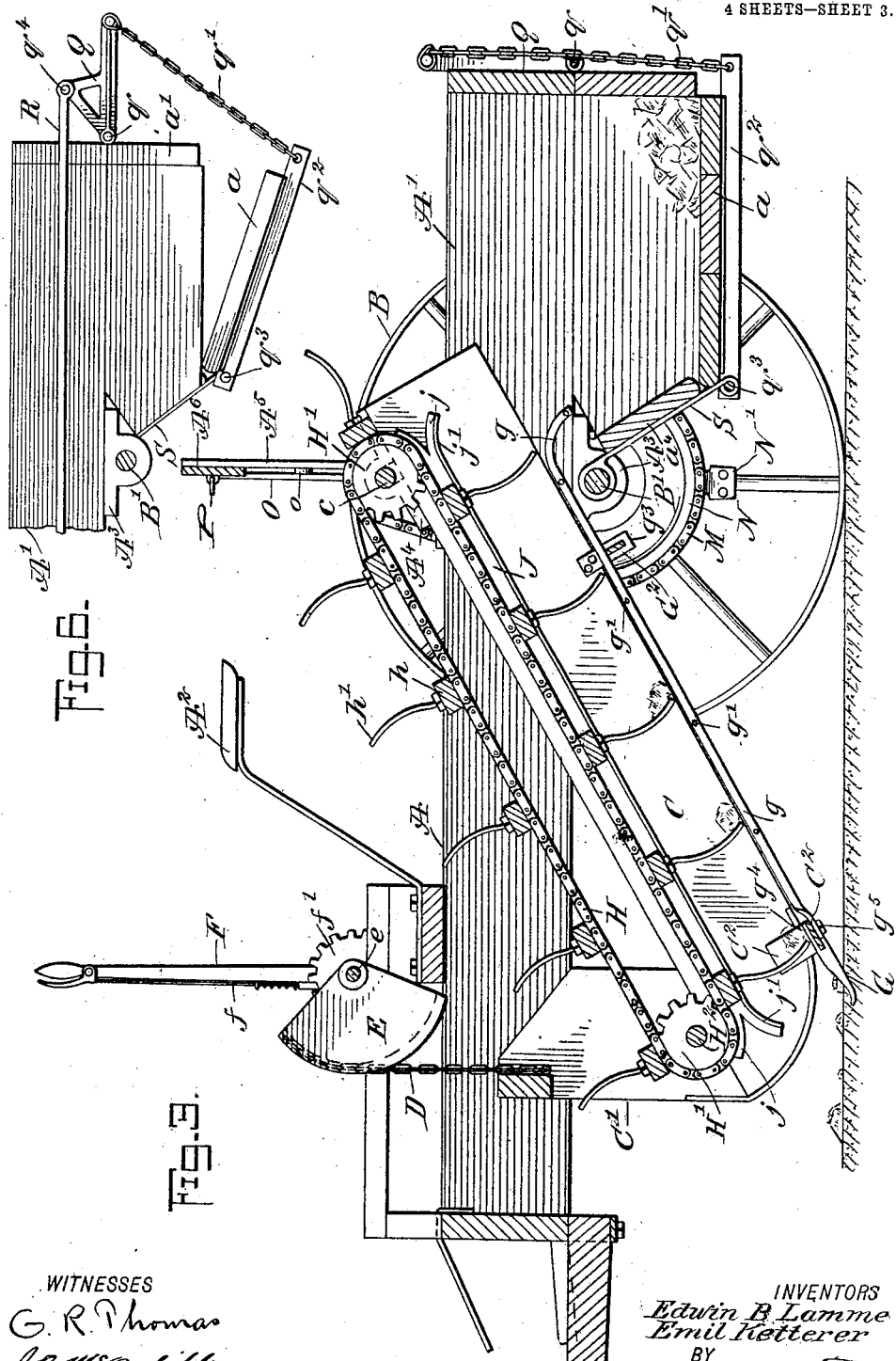
WITNESSES
G. R. Thomas
J. L. McAuliffe
INVENTORS
Edwin B. Lamme
Emil Ketterer
BY
ATTORNEYS No. 891,709. PATENTED JUNE 23, 1908.
E. B. LAMME & E. KETTERER.
STONE GATHERING MACHINE.
APPLICATION FILED OCT. 1, 1907.
4 SHEETS—SHEET 4.
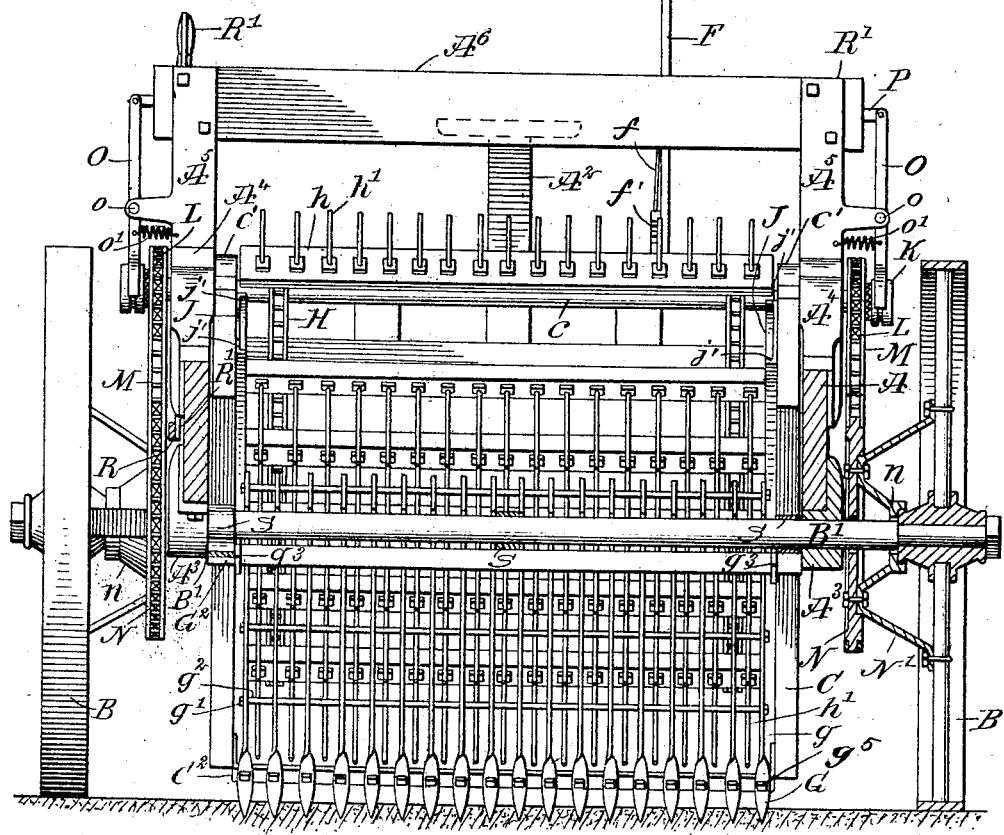
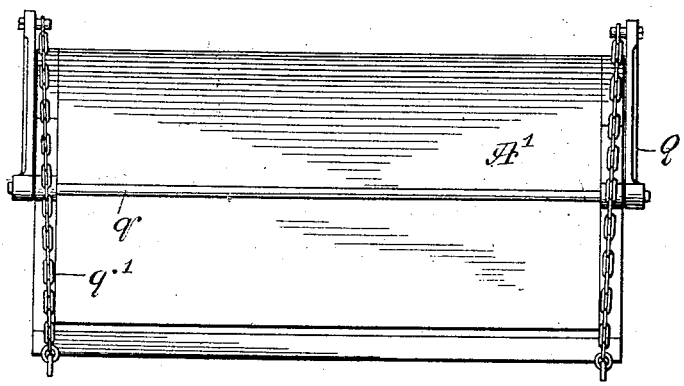
WITNESSES
G. R. Thomas
J. L. McAuliffe
INVENTORS
Edwin B. Lamme
Emil Ketterer
BY
ATTORNEYS

UNITED STATES PATENT OFFICE.

EDWIN BATES LAMME AND EMIL KETTERER, OF BOZEMAN, MONTANA.

STONE-GATHERING MACHINE.

No. 891,709.

Specification of Letters Patent.

Patented June 23, 1908.

Application filed October 1, 1907. Serial No. 395,344.

*To all whom it may concern:*

Be it known that we, EDWIN B. LAMME and EMIL KETTERER, both citizens of the United States, and residents of Bozeman, in the county of Gallatin and State of Montana, have invented a new and Improved Stone-Gathering Machine, of which the following is a full, clear, and exact description.

The invention is more particularly intended for picking and gathering stones, and it relates to that class of machines in which a wheeled vehicle is equipped with picking and elevating means for collecting and delivering the stones to a receptacle on the vehicle.

The object of the invention is to improve in various particulars the gathering machines of the general character indicated; first, as to the form of vehicle body and the receiver to which the gathered material is delivered, to the end that increased strength and compactness may be attained; and secondly, as to the picking and elevating means with their controlling appurtenances, with a view to so arrange and support these parts relatively to the vehicle body and wheels as to afford a maximum strength and resistance to the strains incident to the operation, while providing a simple and practical construction effective and expeditious in picking up and delivering the material.

Reference is to be had to the accompanying drawings forming a part of this specification, in which similar characters of reference indicate corresponding parts in all the views.

Figure 1:
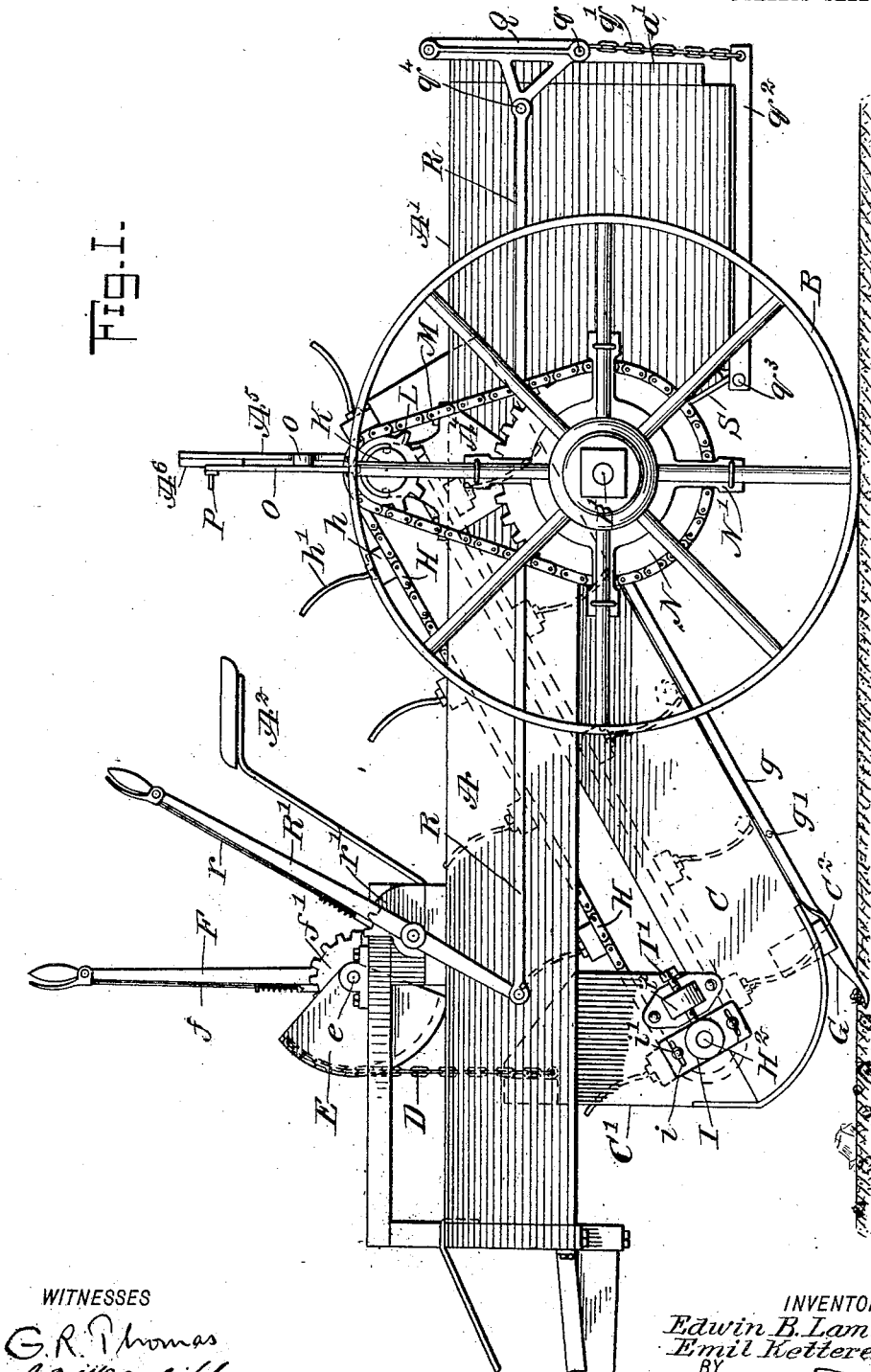
Figure 2:
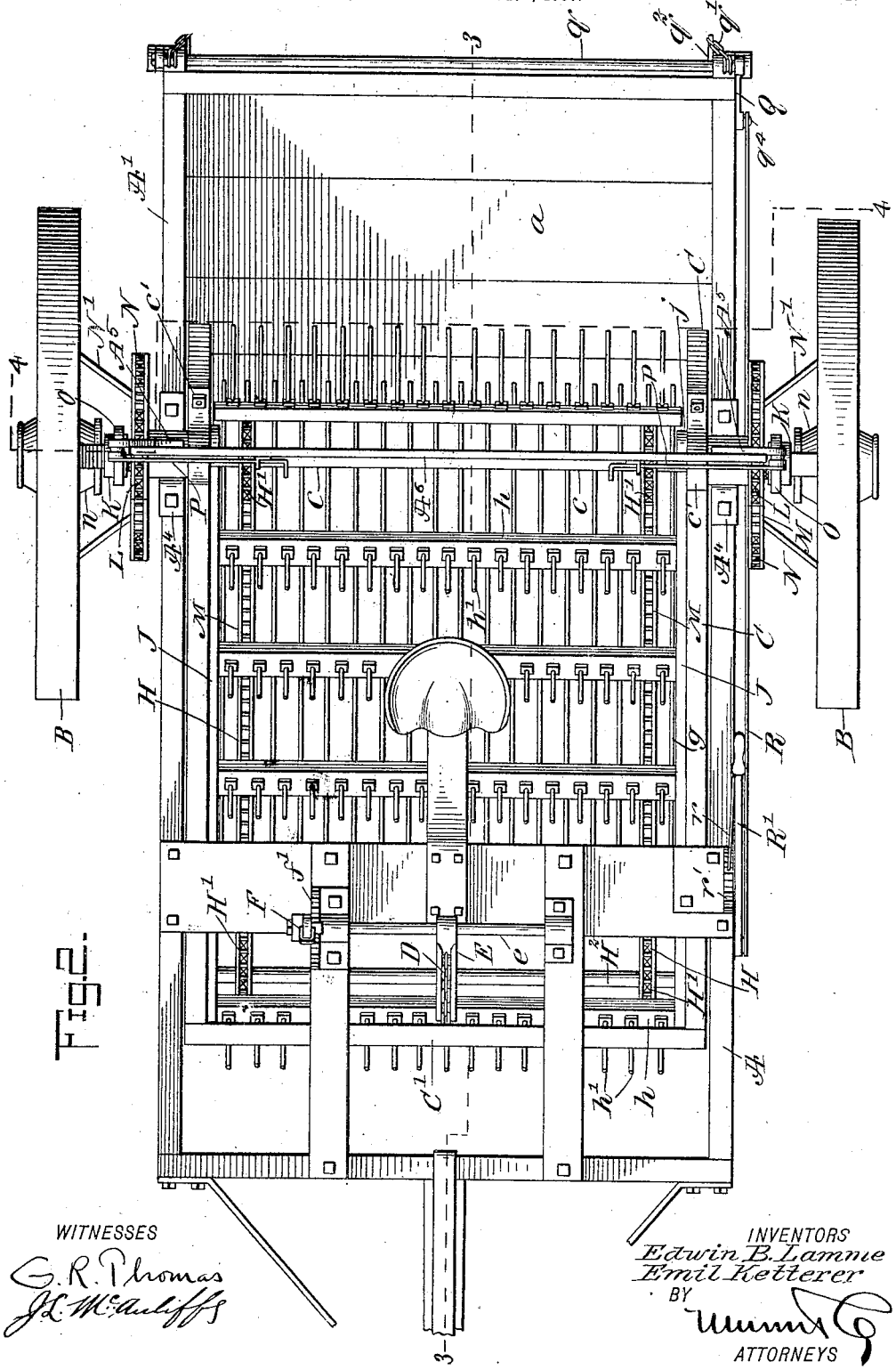

Figure 1 is a side elevation of a machine constructed in accordance with our invention; Fig. 2 is a plan view thereof; Fig. 3 is a longitudinal vertical section taken on the line 3—3 of Fig. 2; Fig. 4 is a transverse vertical section taken about on the line 4—4 of Fig. 2; Fig. 5 is a rear view of the vehicle body, showing the receiver thereof and the means for raising and lowering the dumping bottom of the receiver, the bottom being shown closed; and Fig. 6 is a fragmentary side view of the rear end of the vehicle body, showing said receiver with the dumping bottom in an open position.

We have illustrated one embodiment of the invention as showing a practical form thereof and will particularly explain the details of this illustrated construction and will point out the invention in the claims.

In constructing a machine in accordance with our invention, a vehicle body A is provided, having a pair of running wheels B mounted on an axle B', which has support in brackets $A^3$ on the under side of the body, rearward of the center of length of the body, and at the rear end A' the body is deepened to constitute a receptacle for receiving the gathered stones or other material. On the said body, at a point directly above the axle B', there is pivoted the frame C which carries the picking and elevating devices, the frame being adapted to be swung on a shaft $c$ having bearings in brackets $A^4$, the frame being inclined downwardly and forwardly, the front end C' projecting upward and being sustained by a chain D or its equivalent, the upper end of which is secured to a grooved segment E, carried by a rock shaft $e$ which is provided with a hand lever F having a spring latch $f$ adapted to engage in a toothed segment $f'$, the arrangement being such that by manipulating the lever F, the shaft and its segment are rocked to wind or unwind the chain D, thereby adjusting the forward end of the frame C and the mechanism carried thereby, toward or from the surface of the ground. Bearing brackets $c'$ (Figs. 2 and 4) are bolted to the frame C and embrace shaft $c$ so that the frame may swing on said shaft.

The frame C is provided with picking devices G for taking up the stones from the ground, and mounted on the frame is an elevating mechanism including endless chains H, and transverse bars $h$, and fingers $h'$, whereby the stones or other material will be elevated and delivered to the receptacle provided at the rear end A' of the vehicle body, the bottom $a$ of which receptacle is adapted to be dumped by means hereinafter described. The picking devices shown consist of a transverse series of picking fingers G, formed on longitudinally ranging bars $g$, the rear ends of which are downwardly curved, as shown in Fig. 6, to direct the stones into the receptacle A'. The picking fingers at their bases embrace a supporting bar $C^2$ secured to the opposite sides of the frame C. The upper portion of each finger has a rear extension $g^4$ which overlies the top of the bar $C^2$, while the main shank of the finger passes beneath the under side of said bar suitable bolts $g^5$ being employed to complete the connection. At intervals along the finger bars $g$, transverse bolts $g'$ pass therethrough, and on said bolts between the bars $g$, spacing sleeves $g^2$ are placed. Additional support is given the longitudinal bars g by means of a transverse bar G² supported at its ends by brackets g³ on the frame C, as shown in Figs. 3 and 4.

The endless chains H of the elevator extend around upper and lower sprocket wheels H', the upper sprocket wheel being mounted on the shaft c, and the lower sprocket wheel on a shaft H² having bearings in blocks I, secured to the forward end of the frame C, said blocks I having slots i through which bolts i' pass, so that said blocks may be adjusted to take up the slack in the chains H by the turning of adjusting screws I' working in blocks i², as clearly shown in Fig. 1.

In the movement of the lower, working run of the elevator, the transverse bars h thereof have guided movement and are sustained in grooves provided at the sides of the frame C. In the form shown, this groove is provided by means of longitudinal plates J, the ends of which diverge as at j (Figs. 2 and 3) for the ready entrance and exit of the bars, and along said plate upper and lower flanges j' are formed.

The shaft c is driven from the running wheels B, said shaft carrying sprocket wheels L, over which pass sprocket chains M, which pass also over sprocket wheels N secured to the running wheels B by spiders N', the hubs n of which spiders fit the inner ends of the wheel hubs, while the outer ends of the spiders are bolted to the spokes, as clearly shown in Fig. 4.

To throw the shaft c into and out of gear with the driving wheels, clutches K are provided on said shaft, the forked shifting levers O of which extend upward and are pivoted intermediate their length, as at o, on upward extensions A⁵ of the brackets A⁴ in which the shaft c rotates, said upward extensions being connected by a transverse bar A⁶. The upper ends of the clutch levers O are fulcrumed to the outer ends of shifting rods P mounted to slide on the cross-bar A⁶. Springs o' secured respectively to the shifting levers O and to the extensions A⁵, tend to normally hold the clutch in operative position.

The dumping bottom a is controlled by devices as follows: On a shaft q mounted on the rear end A' of the body, the lower ends of levers Q are secured, one at each end of said shaft, to the upper ends of which levers, chains q' are fastened, said chains extending downward and connecting with the rearwardly projecting ends of bars q² secured to the under side of the dumping bottom a, the rear ends of the bars q² being pivotally connected, as at q³ with straps S, the rear ends of which embrace the vehicle axle B', on which straps S the inner end a⁴ of the receptacle A' is secured. On one of said levers Q an extension q⁴ is formed intermediate the upper and lower ends of the lever, giving the same the form of a bell crank as shown in Figs. 1 and 6, and to said extension a connecting rod R is secured, the forward end of which is carried by a lever R' having a latch r adapted to engage a toothed segment r', whereby to hold the lever and through the connections described, hold the bottom a in the adjusted position.

By the described construction it will be evident that the fingers G as the machine is drawn over the surface of the ground, will pick up stones or the like, and the fingers h' of the traveling elevator will carry the material rearwardly along the bottom bars g, and deliver the same to the receptacle A', the plates J serving to sustain the elevator bars and enable the fingers to resist any tendency of stones to displace them.

By mounting the rear end of the frame C directly over the vehicle axle, and causing the dumping to be done at this point, a strong construction is produced which minimizes the result of strains in the operation of the machine. It will be observed, also, that the picking devices and elevating mechanism are sustained by the frame C and adjustable therewith, this arrangement providing a strong, compact and simple structure.

Having thus described our invention, we claim as new and desire to secure by Letters Patent:—

1. In a gathering machine, the combination with a wheeled vehicle on which a receptacle is provided, of a forwardly and downwardly inclined frame having longitudinally ranging bars forming the bottom of the frame, the front ends of which are provided with picking fingers, said frame having a crossbar at the front and the picking fingers being secured to said crossbar, the fingers having portions embracing said bar at the top and the bottom of the same said frame having a second crossbar extending beneath the bottom bars near their rear ends; and an endless elevator having movement on said frame and serving to elevate the material picked up by the picking fingers.

2. In a gathering machine, the combination with a wheeled vehicle on which a receptacle is provided, of a forwardly and downwardly inclined frame having longitudinally ranging bars forming the bottom of the frame, the front ends of said bars being provided with picking fingers and the rear ends of said bars terminating at the receptacle and being curved downward, the said frame having a crossbar at the front and the picking fingers having portions embracing the crossbar at the top and bottom thereof, said frame having a second crossbar extending beneath the bottom bars near their rear ends; and an endless elevator having movement on said frame and serving to elevate the material picked up by the picking fingers.

3. In a gathering machine, the combination with a wheeled vehicle provided with a receptacle, of a frame provided with picking fingers at its front end and a crossbar to which said fingers are secured, the fingers having portions embracing said bar at the top and bottom of the same, and elevating means having movement on said frame for elevating the material from the picking fingers.

In testimony whereof we have signed our names to this specification in the presence of two subscribing witnesses.

EDWIN BATES LAMME.
EMIL KETTERER.

Witnesses:
ALFORD YERGEY,
J. H. BAKER.